United States Patent
Wang (10) Patent No.: US 10,210,545 B2
(45) Date of Patent: Feb. 19, 2019

(54) METHOD AND SYSTEM FOR GROUPING DEVICES IN A SAME SPACE FOR CROSS-DEVICE MARKETING

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 534 days.

(21) Appl. No.: 14/984,987

(22) Filed: Dec. 30, 2015

(65) Prior Publication Data
US 2017/0193552 A1 Jul. 6, 2017

(51) Int. Cl.
*G06Q 30/00* (2012.01)
*G06Q 30/02* (2012.01)
*H04L 29/08* (2006.01)
*H04W 4/02* (2018.01)

(52) U.S. Cl.
CPC ..... *G06Q 30/0261* (2013.01); *G06Q 30/0267* (2013.01); *H04L 67/10* (2013.01); *H04L 67/12* (2013.01); *H04L 67/18* (2013.01); *H04L 67/26* (2013.01); *H04W 4/023* (2013.01)

(58) Field of Classification Search
CPC ............ G06Q 30/0261; G06Q 30/0267; H04L 67/12; H04W 4/023
USPC ................................ 705/14.49, 14.58, 14.64
See application file for complete search history.

(56) References Cited

U.S. PATENT DOCUMENTS

| | | | | |
|---|---|---|---|---|
| 5,276,909 A | * | 1/1994 | Milner | G08G 1/092 340/7.48 |
| 5,940,429 A | * | 8/1999 | Lam | G10L 19/018 370/527 |
| 5,995,553 A | * | 11/1999 | Crandall | G08B 25/085 375/272 |
| 6,357,029 B1 | * | 3/2002 | Sinha | H04L 1/0054 714/701 |
| 6,601,032 B1 | * | 7/2003 | Surucu | G10L 19/02 704/500 |
| 7,533,266 B2 | * | 5/2009 | Bruekers | G06F 21/10 713/176 |

(Continued)

OTHER PUBLICATIONS

Robust Entropy-Based Endpoint Detection for Speech Recognition in Noisy Environments. Shen, et al., ISCA, 1998. (Year: 1998).*

(Continued)

*Primary Examiner* — Luis A Brown
(74) *Attorney, Agent, or Firm* — Anova Law Group, PLLC (57) ABSTRACT

The present disclosure provides a method for grouping devices in a same place. A plurality of devices may be connected to a server. The devices may be classified two types based on mobility, including a stable device type and a mobile device type. One or more neighborhood devices associated with at least one stable device may be identified based on status information of the plurality of devices. The at least one stable device and the one or more neighborhood devices may respectively record an audio sample at a set time. A similarity score between the audio sample of the one or more neighborhood devices and the audio sample of the at least one stable device may be calculated. Further, one or more devices among the one or more neighborhood devices may be determined as in a same space as the at least one stable device based on the similarity score.

16 Claims, 3 Drawing Sheets

(56) References Cited

U.S. PATENT DOCUMENTS

| | | | | | |
|---|---|---|---|---|---|
| 7,961,881 B2* | 6/2011 | Jensen | ............. | H04H 20/31 | |
| | | | | | 380/241 |
| 8,085,975 B2* | 12/2011 | Srinivasan | ............. | G10L 19/018 | |
| | | | | | 382/100 |
| 8,782,202 B2* | 7/2014 | Shima | ............. | G06F 3/1214 | |
| | | | | | 709/206 |
| 8,849,858 B2* | 9/2014 | Lim | ............. | G06F 21/6218 | |
| | | | | | 707/785 |
| 9,330,194 B2* | 5/2016 | Nakamura | ............. | G06F 17/30899 | |
| 2003/0110516 A1* | 6/2003 | Chang | ............. | H04N 7/025 | |
| | | | | | 725/136 |
| 2004/0068399 A1* | 4/2004 | Ding | ............. | G10L 19/018 | |
| | | | | | 704/200.1 |
| 2004/0184783 A1* | 9/2004 | Tanaka | ............. | G11B 20/10527 | |
| | | | | | 386/240 |
| 2004/0209658 A1* | 10/2004 | Liu | ............. | G08B 21/24 | |
| | | | | | 455/575.2 |
| 2005/0097334 A1* | 5/2005 | Kirovski | ............. | G06T 1/005 | |
| | | | | | 713/176 |
| 2005/0159132 A1* | 7/2005 | Wright | ............. | H04L 51/00 | |
| | | | | | 455/404.1 |
| 2006/0070006 A1* | 3/2006 | Erol | ............. | H04N 1/00326 | |
| | | | | | 715/764 |
| 2006/0168448 A1* | 7/2006 | Van Der Veen | ............. | G06T 1/005 | |
| | | | | | 713/176 |
| 2008/0133416 A1* | 6/2008 | Rhoads | ............. | G06F 21/10 | |
| | | | | | 705/51 |
| 2008/0262928 A1* | 10/2008 | Michaelis | ............. | G06Q 30/02 | |
| | | | | | 705/14.26 |
| 2009/0132391 A1* | 5/2009 | Jacobs | ............. | G06Q 30/0601 | |
| | | | | | 705/26.1 |
| 2010/0036384 A1* | 2/2010 | Gorek | ............. | A61B 34/20 | |
| | | | | | 606/104 |
| 2010/0040210 A1* | 2/2010 | Tan | ............. | H04L 63/08 | |
| | | | | | 379/93.02 |
| 2010/0134278 A1* | 6/2010 | Srinivasan | ............. | G06Q 30/02 | |
| | | | | | 340/539.13 |
| 2010/0158311 A1* | 6/2010 | Takahashi | ............. | G06T 1/0064 | |
| | | | | | 382/100 |
| 2010/0246955 A1* | 9/2010 | Wright | ............. | G06K 9/00711 | |
| | | | | | 382/173 |
| 2011/0029832 A1* | 2/2011 | Birmingham | ............. | H04L 1/0084 | |
| | | | | | 714/748 |
| 2011/0069937 A1* | 3/2011 | Toerner | ............. | H04N 21/23892 | |
| | | | | | 386/250 |
| 2011/0238192 A1* | 9/2011 | Shah | ............. | G10L 19/018 | |
| | | | | | 700/94 |
| 2011/0246202 A1* | 10/2011 | McMillan | ............. | G10L 19/018 | |
| | | | | | 704/270 |
| 2012/0017231 A1* | 1/2012 | Chao | ............. | G06Q 30/02 | |
| | | | | | 725/12 |
| 2012/0022879 A1* | 1/2012 | Srinivasan | ............. | G10L 19/018 | |
| | | | | | 704/500 |
| 2012/0075083 A1* | 3/2012 | Isaacs | ............. | H04M 3/42382 | |
| | | | | | 340/13.2 |
| 2012/0191512 A1* | 7/2012 | Wuoti | ............. | G06Q 30/0207 | |
| | | | | | 705/14.1 |
| 2013/0322614 A1* | 12/2013 | Hodge | ............. | H04M 3/56 | |
| | | | | | 379/207.06 |
| 2015/0127710 A1* | 5/2015 | Ady | ............. | H04W 4/21 | |
| | | | | | 709/202 |
| 2015/0131804 A1* | 5/2015 | Wang | ............. | G06F 17/3074 | |
| | | | | | 381/56 |
| 2015/0312304 A1* | 10/2015 | Landais | ............. | H04H 20/22 | |
| | | | | | 709/219 |
| 2016/0050457 A1* | 2/2016 | Mondal | ............. | H04N 21/44204 | |
| | | | | | 725/18 |
| 2016/0174036 A1* | 6/2016 | Ruhstaller | ............. | H04H 20/38 | |
| | | | | | 455/456.3 |
| 2017/0034579 A1* | 2/2017 | Caudell | ............. | H04N 21/454 | |
| 2017/0111226 A1* | 4/2017 | Zhou | ............. | H04L 41/0893 | |
| 2017/0177423 A1* | 6/2017 | Bradley | ............. | G06F 9/542 | |

OTHER PUBLICATIONS

Voice Activity Detection Algorithm with Low Signal-To-Noise Ratios based on Spectrum Entropy. Wang, et al., Second International Symposium on Universal Communication, 2008. (Year: 2008).*

\* cited by examiner

METHOD AND SYSTEM FOR GROUPING DEVICES IN A SAME SPACE FOR CROSS-DEVICE MARKETING

FIELD OF THE DISCLOSURE

The present disclosure relates to the field of information technologies and, more particularly, relates to a method and system for grouping devices in a same space for cross-device marketing.

BACKGROUND

With fast growing Internet of Things (IoT), many devices in the living rooms are turned into connected devices (e.g., TVs, refrigerators, air conditionings, Digital Frames, and so on). With the massive deployment of mobile devices (e.g., tables, smartphones, smart watches, and so on), nowadays the human living spaces become "smart living rooms" with many smart (or connected) devices preforming different functions. As a consequence, cross-device marketing has become a big opportunity for service or advertisement (ad) providers.

However, how to deliver the right service (or ad) to the right user across all devices surrounding him/her has become a new challenge. Specifically, automatically grouping devices in the living room are challenging, because the devices are made by various manufacturers and the mobility nature of some devices makes the grouping only temporary. Some existing technology uses common WiFi connections (or common IP address) as a clue to group devices. However, this grouping method is very unreliable as many devices not appearing in the living room (may be in rooms upstairs) may use the same WiFi.

The disclosed method and system are directed to solve one or more problems set forth above and other problems.

BRIEF SUMMARY OF THE DISCLOSURE

One aspect of the present disclosure provides a method for grouping devices in a same place. A plurality of devices may be connected to a server. The devices may be classified two types based on mobility, including a stable device type and a mobile device type. One or more neighborhood devices associated with at least one stable device may be identified based on status information of the plurality of devices. The at least one stable device and the one or more neighborhood devices may respectively record an audio sample at a set time. A similarity score between the audio sample of the one or more neighborhood devices and the audio sample of the at least one stable device may be calculated. Further, one or more devices among the one or more neighborhood devices may be determined as in a same space as the at least one stable device based on the similarity score.

Another aspect of the present disclosure provides a server for grouping devices in a same space. The server may include a communication module and a control module. The communication module may be configured to connect to a plurality of devices, obtain status information from the plurality of devices, and send a control request to the plurality of devices. The control module may be configured to classify the plurality of devices to two types based on mobility, including a stable device type and a mobile device type, and identify one or more neighborhood devices associated with at least one stable device based on the status information of the plurality of devices. The control module may be further configured to respectively request the at least one stable device and the one or more neighborhood devices to record and send an audio sample at a set time through the communication module, respectively calculate a similarity score between the audio sample of the one or more neighborhood devices and the audio sample of the at least one stable device; and determine one or more devices among the one or more neighborhood devices as in a same space as the at least one stable device based on the similarity score.

Another aspect of the present disclosure provides a system for grouping devices in a same space. The system may include a plurality of devices having audio recording and communication capabilities, and a server. The server may include a communication module and a control module. The communication module may be configured to connect to a plurality of devices, obtain status information from the plurality of devices, and send a control request to the plurality of devices. The control module may be configured to classify the plurality of devices to two types based on mobility, including a stable device type and a mobile device type, and identify one or more neighborhood devices associated with at least one stable device based on the status information of the plurality of devices. The control module may be further configured to respectively request the at least one stable device and the one or more neighborhood devices to record and send an audio sample at a set time through the communication module, respectively calculate a similarity score between the audio sample of the one or more neighborhood devices and the audio sample of the at least one stable device; and determine one or more devices among the one or more neighborhood devices as in a same space as the at least one stable device based on the similarity score. The devices are further configured to respond to the control request from the server.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 1:
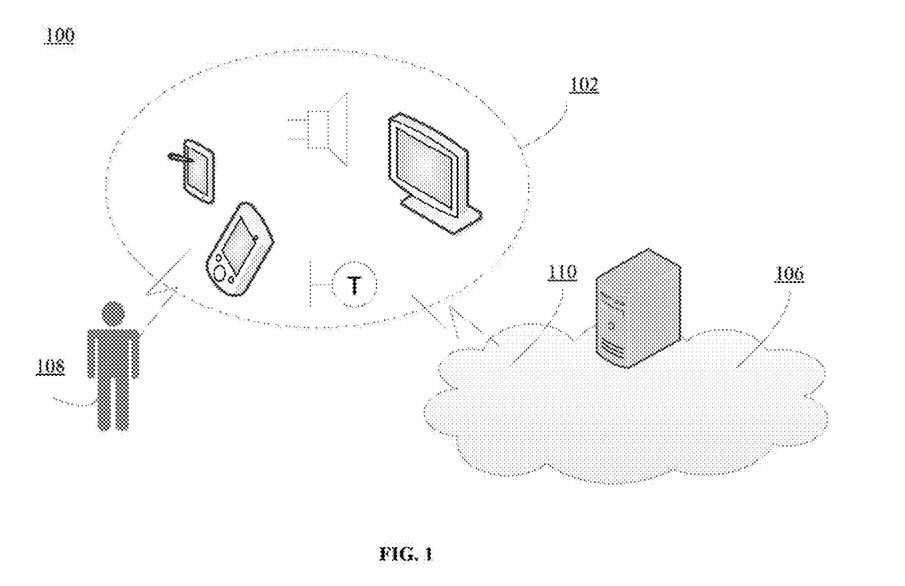
FIG. 1 illustrates an exemplary environment incorporating certain embodiments of the present invention.

FIG. 1 illustrates an exemplary environment 100 incorporating certain disclosed embodiments. As shown in FIG. 1, environment 100 may include a plurality of terminals 102, a server 106, a user 108 and a network 110. Certain device(s) may be omitted and other devices may be added. A user 108 may operate terminals 102 for certain services provided by server 106. Although only one server 106 and five terminals 102 are shown in the environment 100, any number of terminals 102 or servers 106 may be included, and other devices may also be included.

Terminal 102 may refer to any appropriate user terminal with certain computing capabilities, such as a personal computer, a hand-held computing device (tablet), a smart phone or mobile phone, or any other user-side computing device. Terminal 102 may further include smart electronics and appliances with computing and communication capabilities, such as a television set (TV), a refrigerator, a speaker, a digital frame, a thermostat, an LED light, etc. Terminal 102 may be implemented on any appropriate computing platform. Terminals 102 may be used by user 108 to connect to network 110 and communicate with server 106.

Server 106 may refer to one or more server computers configured to provide certain server functionalities (e.g., processing audio signals, distributing image or audio contents), such as data query and computation tasks. Server 106 may include one or more processors to execute computer programs in parallel. Server 106 may store data (e.g., images, sounds, and commercials) to be accessed by terminals 102.

Although server 106 is shown in a single computer configuration, more computers or server clusters can be included in server 106. Server 106 may provide cloud-based services in a cloud computing environment, i.e., the use of computing resources (hardware and software) that are delivered as a service over a network infrastructure (e.g., the Internet). The cloud computing environment may include any private cloud configuration and/or public cloud configuration. Various servers 106 (i.e., server services) in the cloud may be configured to provide data storage and computation functionalities (e.g., grouping devices in a same space for cross-device services).

Terminal 102 and server 106 may communicate with each other through communication network 110, such as the Internet or other types of computer networks or telecommunication networks, either wired or wireless, such as a cable network, a phone network, and/or a satellite network, etc. Further, terminal 102 may communicate with other terminals 102 through communication network 110, such as the Internet, Bluetooth communication, infrared communication, WiFi communication, etc.

Figure 2:
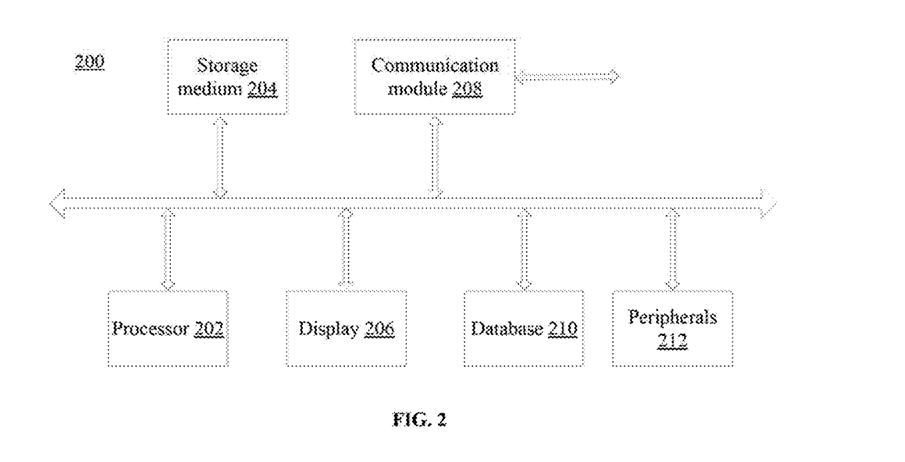
FIG. 2 illustrates an exemplary computing system consistent with the disclosed embodiments.

Terminal 102 and/or server 106 may be implemented on any appropriate computing circuitry platform. FIG. 2 shows a block diagram of an exemplary computing system 200 capable of implementing terminal 102 and/or server 106.

As shown in FIG. 2, computer system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Processor 202 may execute sequences of computer program instructions to perform various processes, such as an information processing program. Storage medium 204 may include memory modules, such as ROM, RAM, flash memory modules, and erasable and rewritable memory, and mass storages, such as CD-ROM, U-disk, and hard disk, etc. Storage medium 204 may store computer programs for implementing various processes, when executed by processor 202.

Further, communication module 208 may include network devices for establishing connections through the network 110. Database 210 may include one or more databases for storing certain data (e.g., images, videos and audios) and for performing certain operations on the stored data, such as database searching and data retrieving.

Display 206 may include any appropriate type of computer display device or electronic device display (e.g., CRT or LCD based devices, touch screens, LED display). Peripherals 212 may include various sensors and other I/O devices, such as microphone, speaker, camera, motion sensors, position sensors, keyboard, mouse, etc.

Figure 3:
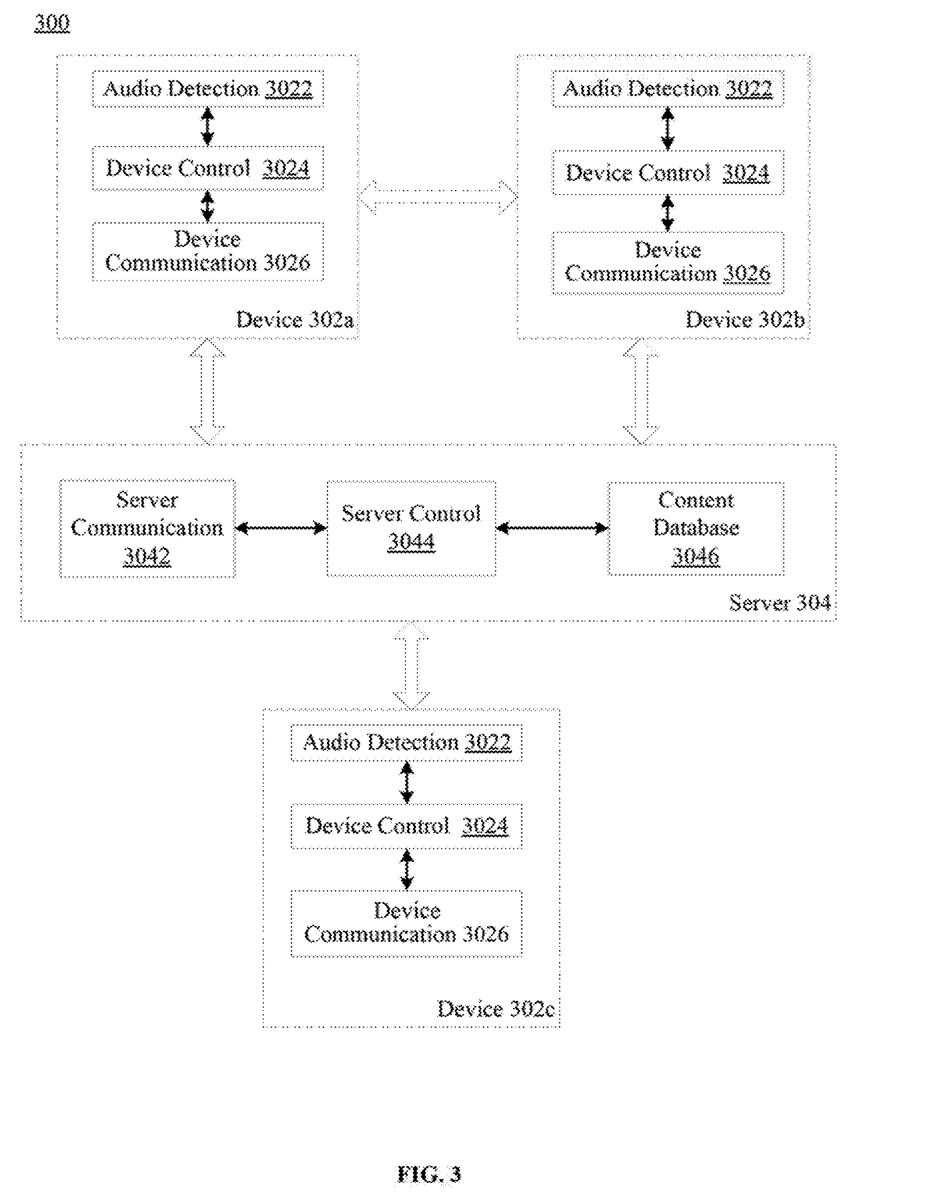
FIG. 3 illustrates an exemplary system for grouping devices in a same space consistent with the disclosed embodiments.

In operation, server 106 and/or terminal 102 may group devices (e.g., terminals 102) in a same space for cross-device services. FIG. 3 illustrates an exemplary system for grouping devices in a same space consistent with the disclosed embodiments.

As shown in FIG. 3, the exemplary system 300 may include a plurality of devices 302 and a server 304. Any number of devices 302 may be included. For exemplary purposes, a first device 302a, a second device 302b, and a third device 302c are shown in FIG. 3.

The device 302 may include any electronics and appliances that have communication and computing capabilities, such as a desktop computer, a laptop computer, a tablet, a mobile phone, a TV, a streaming media player (e.g., Apple TV, Roku), a game console, a refrigerator, a speaker, headphones, a digital frame, a smart thermostat, a smart LED light, a smart watch, a smart scale, a router, etc. The device 302 may be classified into two categories: stable device and mobile device. A stable device may refer to a device with a sustainable power supply, a device installed at a fixed location, or a device assigned by a user or service provider as a stable device. A mobile device may refer to a device that commonly operates on a battery or a device designed to be moved around.

The devices 302 may be configured to record and process an audio signal, and transmit the processed audio signal and a status information to the server 304. Further, the devices 302 may be configured to receive a control request from the server 304, and perform an action based on the control request. The device 302 may be implemented on terminal 102.

The server 304 may be configured to receive the status information and the audio signals from a plurality of devices 302, determine one or more devices 302 that are in a same space based on the received identification signals and the audio signals, and send control requests to the devices 302 in the same space to provide cross-device services. The server 304 may be implemented on server 106 or terminal 102. In some embodiments, the server 304 may be implemented on one of the devices 302.

That is, the server 304 may have access to the status of the devices 302 including network connection (e.g., IP address, WiFi router address) and/or location (e.g., GPS location) of the devices 302. Further, the server 304 may obtain context-awareness data (e.g., audio recordings) from the devices 302, for example, through APIs (application program interface) in the devices 302. Based on results from learning process on the server 304, one or more devices 302 in a same space may be grouped together for the cross-device services.

The cross-device service may include pushing contents to some devices 302, such as pushing advertisements to the devices 302, providing image/gallery services for home decoration (e.g., projecting images to digital frames/TV screens from a central controlled content center), providing location-specific contents in corresponding sections in a large indoor building (e.g., museum, exhibition hall, supermarket), and so on. In these scenarios, the service provider (i.e., server 304) may receive high-volume requests from devices allocated in a distributed manner. Thus, determining the groups of these devices may significantly improve the cross-device service performance.

The same space where the grouped devices are located may be defined on the server 304 based on different application scenarios. In one embodiment, the same space may refer to a same room in a house, such as a living room. For example, the living room may include a TV and a digital frame. When a user leaves a phone in the living room, the TV, the digital frame and the phone may be grouped together by the server 304. The server 304 may send contents or instructions to the grouped devices in the living room. When the user takes the phone upstairs or to a bedroom, the sever 304 may group the TV and the digital frame in the same group and exclude the phone. Further, the phone may be grouped with other devices in the bedroom by the server 304.

In another embodiment, the same space may refer to a same section in an exhibition hall. For example, the exhibition hall may be divided into five sections associated with five topics. A first section may include a projector and a speaker. The server 304 may determine the project, the speaker, and phones or other electronics (e.g., guiding device) carried by visitors in the first section belong to the first group. Similarly, the server 304 may determine electronics placed in a second section and electronics carried by visitors in the second section belong to a second group. Further, the server 304 may send different contents to devices in the first group and the second group.

In operation, the server 304 may connect to a plurality of devices 302 (e.g., device 302a, 302b, and 302c) and retrieve status information of the devices 302. The server 304 may determine at least one stable device (e.g., device 302a) and detect one or more neighborhood devices (e.g., device 302b and device 302c) of the stable device according to the retrieved information. The server 304 may request the stable device (e.g., device 302a) to record a sound sample and determine whether the sound sample is a noticeable sound sample. Once a noticeable sound sample occurs, the server 304 may request the stable device (e.g., device 302a) and the neighborhood devices (e.g., device 302b and device 302c) of the stable device to record and send an audio sample respectively. Acoustic fingerprints of the collected audio samples may be generated. The server 304 may match the acoustic fingerprints and group devices having similar acoustic fingerprints (e.g., device 302a and device 302b) as devices in a same space. The server 304 may further provide cross-device services based on device groups.

In an exemplary embodiment, the device 302 may include an audio detection module 3022, a device control module 3024, and a device communication module 3026. The server 304 may include a server communication module 3042, a server control module 3044, and a content database 3046.

The audio detection module 3022 may be configured to record an audio sample from surroundings of the device 302 and send the audio sample to the device control module 3024. In some embodiments, the audio detection module 3022 may be a microphone. According to instructions from the device control module 3024 or from the serve 304, the audio detection module 3022 may collect audio samples periodically or collect one audio sample upon each request.

The device control module 3024 may be configured to receive and process the audio sample, generate an acoustic fingerprint of the audio sample, and send the acoustic fingerprint to the device communication module 3026. In some embodiments, the device control module 3024 may directly send the audio sample to the device communication module 3026 to be transmitted to the server 304, and the acoustic fingerprint of the audio sample may be generated on the server 304.

Further, the device control module 3024 may be configured to send status information to the device communication module 3026. The status information may include at least a type of the device 302 and identification information of the device 302. The type of the device 302 may indicate the device model or type, such as a TV model, a phone model, a digital frame type, a speaker type, etc. The identification information of the device 302 may include, for example, an IP address, a WiFi router address, a MAC address, a GPS location, etc. In some embodiments, the status signal may further include other information associated with the device 302, such as connected device, volume, operation mode (e.g., wake, hibernation), resource consumption, temperature, etc.

The device control module 3024 may further be configured to receive a control request from the server 304 and perform an action based on the control request. For example, the control request may include recording an audio sample at a set time and sending the audio sample or the acoustic fingerprint of the audio sample to the server 304. The length of the audio sample may be preset or may be included in the control request.

In another example, the control request may be an instruction to display or broadcast media contents (e.g., sounds, images, videos). The media contents may be stored locally on the device 302, or included in the control request. In another example, the control request may be changing configuration of the device 302, such as adjusting brightness and color of an LED light, adjusting volume of an TV or a speaker, changing a temperature setting of a thermostat, etc.

The device communication module 3026 may be configured to transmit data with the server 304 (e.g., through the communication module 3041). The device communication module 3026 may send the acoustic fingerprint and the status information to the server 304. The device communication module 3026 may receive a control request from the server 304 and send the control request to the device control module 3024.

The device communication module 3026 may support at least one of WiFi communication, infrared communication, Bluetooth communication, telecommunication (e.g., 3G network, 4G network), and cable connection. In some embodiments, the device communication module 3026 of a device 302a may further be configured to communicate with the device communication module 3026 of a second device 302b. For example, a speaker may connect to a phone via Bluetooth, or tablet may cast a video on a TV via WiFi connection. The device communication module 3026 may transmit data with the server 304 using one connection protocol (e.g., Bluetooth), and transmit data with another device 302 using a same connection protocol or a different connection protocol (e.g., WiFi).

The server communication module 3042 may be configured to receive the status information and the acoustic fingerprints from a plurality of devices 302 (e.g., through the communication module 3024), and send control requests to one or more devices 302 to provide cross-device services. The server communication module 3042 may support at least one of WiFi communication, infrared communication, Bluetooth communication, telecommunication, and cable connection.

The server control module 3044 may be configured to determine at least one stable device. According to the status information sent from the plurality of devices 302, the server control module 3044 may classify the devices into two categories: stable device and mobile devices. The type of the device may be used to determine whether a device is a mobile or not. In some embodiments, the server control module 3044 may include a list of device types and corresponding mobility classification. The server control module 3044 may match the retrieved device type with the list and obtain the corresponding classification result of the device. In some embodiments, the server control module 3044 may receive a user input to identify the categories of the devices.

For example, in a living room, stable devices may include TV, refrigerator, digital frame, light, thermostat and so on. These devices may stay in the living room all the time, and the IP address, WiFi access, and GPS location of the stable devices may remain unchanged. Mobile devices may be a phone, a tablet, a smart watch, etc. Mobile devices may have different IP address or access different WiFi network depending on the location.

Further, according to the status information sent from the plurality of devices 302, the server control module 3044 may be configured to detect neighborhood devices of the at least on stable device based on connections among the devices. That is, the status information from a device may indicate a connection with other devices. For example, when two devices are connected to each other via Bluetooth, the two devices are determined as neighborhood devices. When a cast function is used between a phone and a TV, the phone and the TV are determined as neighborhood devices. When a number of devices are connected to a same router, these devices are determined as neighborhood devices.

The server control module 3044 may be configured to request the at least one stable device to perform a sound sampling and determine an occurrence of a noticeable sound. The noticeable sound may occur when, for example, a TV program is playing, people are talking, audible noise are presented, and so on. One or more content measurement metrics may be used to determine the occurrence of the noticeable sound, such as signal-to-noise ratio of the sampled sound, entropy of the sampled sound, dissimilarity compared to a previously sampled sound or a standard sample, etc. When one or more content measurements of the sound sample reach a preset threshold, the server control module 3044 may determine that a noticeable sound occurs.

Once the noticeable sound occurs, the server control module 3044 may be further configured to send control requests to all neighborhood devices 302 and the stable device 302 to record an audio sample through the communication module 3042. The raw audio sample may be collected with a uniform length (e.g., five seconds) at a substantially same time point (e.g., within ±0.01 s at 09:05 AM). The acoustic fingerprint of the audio sample may either be generated on the device 302 or generated on the server 304. Thus, the server control module 3044 may obtain the acoustic fingerprints of the stable device and the neighborhood devices of the stable device.

The server control module 3044 may be configured to match acoustic fingerprints between the at least one stable device and the neighborhood devices of the stable device to identify device group. The server control module 3044 may calculate a similarity score between the acoustic fingerprint of a stable device and the acoustic fingerprint of a neighborhood device to determine whether similar acoustic data are detected by these devices. In other words, devices hearing the same sounds may be determined as in the same group.

The server control module 3044 may be configured to determine the neighborhood device is in a same group as the stable device when the similarity score is above a preset threshold. Accordingly, the server control module 3044 may detect one or more groups based on the acoustic fingerprints of the audio samples from the plurality of devices 302. That is, acoustic information sensed by the devices may be used as a cue to determine whether the devices 302 can sense a same acoustic background. The devices 302 that are receiving similar surrounding sound may be determined as in the same group in a same space.

When groups are detected, the server control module 3044 may be further configured to send control requests to the devices 302 in the same group to provide cross-device services. In one embodiment, the cross-device service may be content presentation. The server control module 3044 may retrieve media contents from the content database 3046 and push the media contents to devices 302 in the same group. For example, some devices 302 may receive different format of a same media content based on the device type. In another example, some devices 302 may receive a segment of the media content, and when these devices 302 are put together, a presentation of the complete content may be achieved.

In another embodiment, the cross-device service may be cross-device configuration adjustments. The server control module 3044 may send control requests to adjust configuration of some devices 302 or all devices 302 in a same group. For example, the control request may be switching all devices into hibernation mode. In another example, the control request may be adjusting the volume of one device.

The content database 3046 may be configured to store a variety of contents for a variety of occasions according to the cross-device services. In some embodiments, contents may be stored in groups based on application scenarios. For example, one group of contents may be associated with one advertisement including videos and images, another group of contents may be associated with information about an exhibit including images and texts.

In some embodiments, a same media content may be stored in various formats to match different types of the devices 302. For example, a high resolution image may be associated with TV-type devices, a low resolution image may be associated with devices with smaller screens. Audio content may be extracted from a video to be associated with a speaker or headphones.

In one embodiment, the server 304 may provide an interface to a user or a service provider to access the cross-device service functions. The interface may be an app or a software. The interface may be configured to allow the user or the service provider to monitor status of the devices 302, and send control requests through the interface such that devices 302 in a same group may be managed and controlled together at one place. The interface may be further configured to allow the user or the service provider to upload media contents through the interface.

In some embodiments, the server 304 may be implemented on one of the devices 302. For example, a smart tablet may function as the server, and provide cross-device controls and contents through an installed app. In some embodiments, a cell phone may be assigned as the stable device. The exemplary system 300 may group devices that are in the same space as the cell phone for cross-device services.

Figure 4:
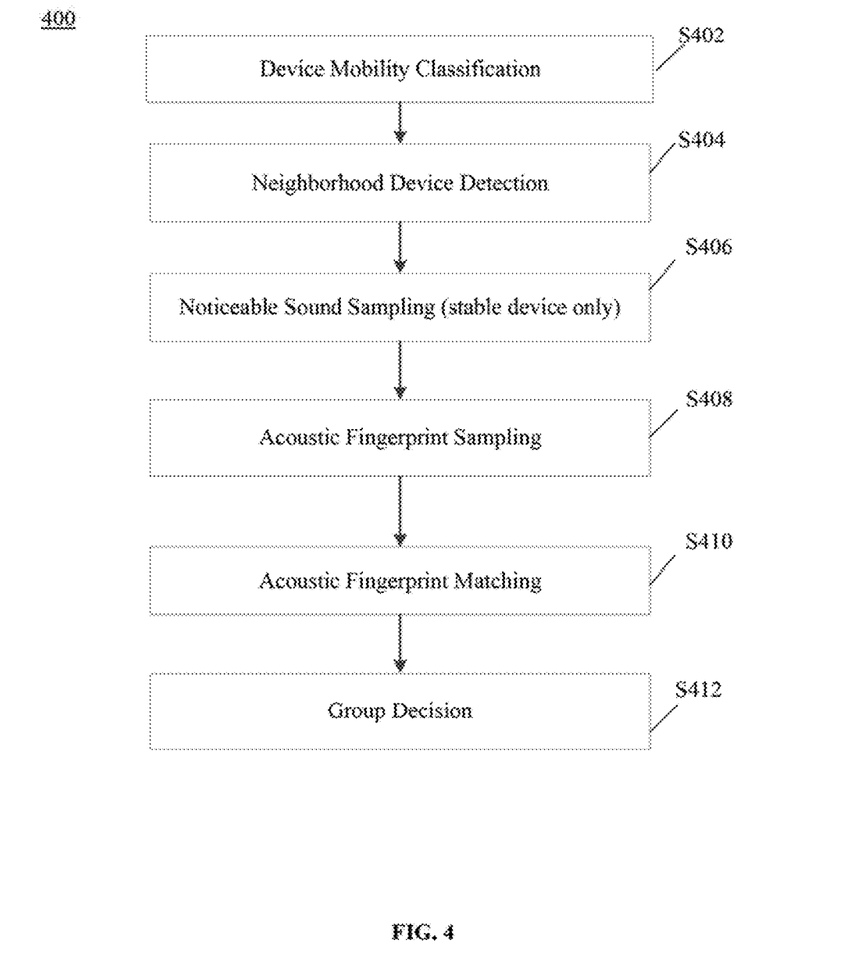
FIG. 4 illustrates an exemplary process for grouping devices in a same space consistent with the disclosed embodiments.

The present disclosure provides a method for grouping devices in a same space for cross-device services. FIG. 4 illustrates an exemplary process for grouping devices in a same space consistent with the disclosed embodiments. The process may be implemented by, for example, the exemplary system 300.

As shown in FIG. 4, a server may connect to a plurality of devices and retrieve status information of the devices. The server may classify the connected devices into two categories based on mobility (S402). The two categories include a stable device and a mobile device. According the status information of the devices, the server may identify at least one stable device based on the device type. The stable device may refer to a device that have sustained power supply, installed at a fixed location, or assigned by a user or a service provider as a stable device.

When the server identifies at least one stable device, the server may detect one or more neighborhood devices of the at least one stable device according to the status information of the devices (S404). The neighborhood devices may include devices that are potentially in a same space as the stable device. A first device and a second device may be determined as neighborhood devices when: the first device is connected with the second device, the first device is in a same network as the second device, the first device is connected with a third device and the third device is the neighborhood device of the second device, the first device is located within a preset range of the second device. The status information such as IP address, WiFi access configuration, and GPS location may be used to determine the neighborhood devices.

In some embodiments, more than one stable device may be identified. For example, when two stable devices are detected, the server may determine whether the two stable devices are neighborhood devices. When the two stable devices are neighborhood devices, other devices associated with the two stable devices may be included in a same set. When the two stable device are not neighborhood devices, the server may determine two sets of devices and perform group detection and cross-device service on the two sets separately.

Further, the server may request one stable device to record a sound sample and determine whether the sound sample is a noticeable sound sample (S406). In one embodiment, the server may periodically request the stable device to collect the sound sample. In another embodiment, when the server receives a cross-device service/marketing request from a service provider or a user, the server may request the stable device to collect sound sample in certain time intervals until a noticeable sound is occurred.

Further, when more than one stable devices are recognized as neighborhood devices, the server may select one stable device to collect sound sample and determine whether the sound sample is a noticeable sound.

When a noticeable sound sample occurs, the server may request each of the stable device and the neighborhood devices of the stable device to collect an audio sample respectively. Acoustic fingerprints of the collected audio samples may be generated either on the server or on the device (S408).

The audio sample collected by each device may be broken down into a numeric signature, which is a unique code for each track of audio sample. The unique code may be referred to as an acoustic fingerprint. The acoustic fingerprint is sufficiently distinguishable such that two fingerprints may be reliably used for similarity comparison. When generating the acoustic fingerprint, signal processing techniques may be applied to accommodate various types of distortions, such as equalizing, white noise, pitching and so on. Thus a robust fingerprint algorithm may be implemented.

Further, the server may match the acoustic fingerprints and group devices having similar acoustic fingerprints as devices in a same space (S410). The server may calculate a similarity score between the acoustic fingerprints, and determine whether the devices are in the same surrounding areas based on the similarity score. Thus, the devices in a same space may be grouped together. In some embodiments, more than one group of devices may be identified.

When the device group are identified, the server may provide cross-device services or cross-device marketing to devices in a same group (i.e., in a same space) (S412). For example, a snack advertisement may be pushed to devices in a grocery section in a super market, and a game advertisement may be pushed to devices in an electronics section in the supermarket.

One application of the disclosed method and system may be in a household. For example, a house may include a kitchen, a living room and a bedroom. Devices that are normally placed in the living room may include a TV, a digital frame, and a thermostat. Devices located in the bedroom may include a laptop computer, a speaker, and a smart bedroom light. A smart refrigerator may locate in the kitchen. Further, family members may have one cell phone, a tablet computer and a smart watch and may move these devices around in the house. All these devices may have audio recording and communication capabilities. Specifically, the TV, the digital frame, the thermostat, the laptop computer, the smart bedroom light and the smart refrigerator may connect to a wireless router in the house, so that they are in a same network. The wireless router may be connected to the Internet. The speaker may be connected to the laptop computer via Bluetooth connection. The smart watch may be connected to a cell phone via Bluetooth connection.

In one embodiment, one of the devices may act as the server 304, such as the TV or the laptop computer. In another embodiment, a cloud server may act as the server 304. The server 304 may connect to the devices (e.g., the smart bedroom light, the digital frame) in the house through the wireless router, or connect to the devices (e.g., cell phone and tablet with data plan) through the Internet. The server 304 may obtain status information of the devices.

The server 304 may classify the devices in the house to two types: stable-type and mobile-type. The TV, the thermostat, the smart bedroom light, the fridge, and the speaker may be determined as stable devices. The cell phone, the tablet, the digital frame, the laptop computer may be determined as mobile devices. In some embodiments, the user may assign a device (e.g., the laptop computer) as stable device.

Further, the server 304 may identify neighborhood devices of the stable device. For example, the devices connected to the same wireless router may all be considered as neighborhood devices. Further, the server 304 may identify the speaker as a neighborhood device of the laptop computer because their Bluetooth connection may be included in the status information of the laptop computer. In addition, the neighborhood devices of the laptop computer may all be considered as neighborhood device of the speaker.

The server 304 may find out devices in a same space as the stable device based on audio recordings from the devices. Specifically, when the server 304 receives a user request to provide cross-device service, the server 304 may request all identified neighborhood devices to record an audio sample. The audio samples may be compared to find the devices having similar sound background such that these devices may be considered as a group in a same space. For example, the audio samples from the laptop computer, the speaker, the cell phone, the smart watch and the smart bedroom light may be determined to be similar, and may be identified as a first group in a same space (i.e., the bedroom). The audio samples from the TV, the digital frame, the thermostat and the tablet may be determined to be similar, and may be identified as a second group in a same space (i.e., the living room). The audio sample from the fridge may be determined to be different with any other audio samples and be regarded as a third group in a same space (i.e., a kitchen).

In some embodiments, the acoustic fingerprint may be extracted from the audio sample. The comparison between the audio samples may be implemented by calculating a similarity score between the acoustic fingerprints.

In some embodiments, the server 304 may request one stable device to record a sound sample and determine whether the sound sample is a noticeable sound sample before requesting all devices to record the audio samples. For example, the server 304 may request the TV to record a sound sample. A content measurement may be calculated from the sound sample using one or more metrics and be compared with a preset threshold. The content measurement metric may be one or a combination of signal-to-noise ratio, entropy, dissimilarity with a standard noise sample, etc. When the content value reaches the preset threshold, the server may determine the sound sample is a noticeable sound sample.

When the devices in the same space are identified and grouped, the server 304 may provide cross-device services based on the groups. In one embodiment, a set of media contents may be pushed to the second group (i.e., devices in the living room). The media contents may be an advertisement or a set of user-selected texts, videos and images. For example, the house owner may implement a creative home decoration project. The server 304 may provide an interface for the house owner to assign media contents to be displayed on the TV, the digital frame, the thermostat and the tablet.

In another embodiment, the cross-device service may include providing cross-device monitoring and configuration adjustment options. The server 304 may provide an interface for the house owner to monitor and adjust device status in the first group (i.e., devices in the bedroom). For example, the server 304 may provide a function to put all devices in the bedroom to hibernation mode when people leaves the room or want to rest. The server 304 may also provide functions to change the brightness of the light, adjust the volume of the speaker, etc. In this way, devices may be conveniently monitored and controlled at one place based on groups.

Further, the family members may move some devices to other rooms. Before providing another cross-device service, the server 304 may request the devices to record audio samples again and regroup the devices based on the similarities between the newly recorded audio samples.

In the disclosed method and system for grouping devices in a same space, all devices may have the capability to sample audio signals and send to the server. The audio signals may be processed to obtain acoustic fingerprints by the device or the server. For mobile devices, the sampling step may be conducted when the service provider (e.g., the server) is ready to push services to the mobile devices, thus the added power consumption for the mobile devices may be negligible. The probing and noticeable sound sampling efforts may be performed by the stable devices with a sustained power supply. Thus the power consumption is not a main concern. When the devices are grouped accurately, the value brought by the services to the devices may be significant.

The disclosed method and system for grouping devices in a same space may be readily fit into the IoT (internet of things) era. To enable cross-device marketing and services, information about which devices are appearing together in a same space may be obtained. Such information is not trivial because the devices are made by various companies and may be owned by multiple users. Further, a decision-making process of a user may involve more than one device while the impact of surrounding device (or even people) may not be ignored. For example, when a device in a bedroom is mistakenly grouped with devices in a living room and starts to play music, the family member in the bedroom may be annoyed. The acoustic-fingerprint based framework in the disclosed method and system may automatically and efficiently identify the devices in the same group at a same space to provide cross-device services.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for grouping devices in a same space, comprising:
   connecting a plurality of devices to a server;
   classifying the plurality of devices to two types based on mobility, including a stable device type and a mobile device type;
   identifying one or more neighborhood devices associated with at least one stable device based on status information of the plurality of devices;
   collecting, by one of the at least one stable device, a sound sample;
   determining whether the sound sample is a noticeable sound sample, wherein a noticeable sound sample is a sound sample with a content measurement above a preset threshold, and at least one of a signal-to-noise ratio of the sound sample and an entropy of the sound sample is used as a content measurement metric to compare with the preset threshold;
   when the sound sample is determined to be a noticeable sound sample, recording, respectively by the at least one stable device and the one or more neighborhood devices, an audio sample at a set time, wherein the audio sample is respectively recorded by the at least one stable device and the one or more neighborhood devices at a same time point in the same space;
   respectively calculating a similarity score between the audio sample of the one or more neighborhood devices and the audio sample of the at least one stable device; and
   determining one or more devices among the one or more neighborhood devices as in the same space as one or more of the at least one stable device based on the similarity score, so that the one or more devices among the one or more neighborhood devices being automatically identified as a same group in the same space.

2. The method according to claim 1, wherein respectively calculating a similarity score further comprises:

generating an acoustic fingerprint for each audio sample, wherein the acoustic fingerprint is a numeric code; and calculating a similarity score between two corresponding acoustic fingerprints to be used as the similarity score between the audio sample of the one or more neighborhood devices and the audio sample of the at least one stable device.

3. The method according to claim 1, wherein:

the status information of a device includes at least one of an IP address, a WiFi access configuration, and a GPS location.

4. The method according to claim 3, wherein a first device and a second device are determined as neighborhood devices when:

the first device is connected with the second device;
the first device is in a same network as the second device;
the first device is connected with a third device and the third device is the neighborhood device of the second device; or
the first device is located within a preset range of the second device.

5. The method according to claim 1, further comprising:

providing a cross-device service to the devices in the same space, wherein the cross-device service includes at least one of: present a media content on one or more devices in the same space, and adjust a setting of one or more devices in the same space.

6. A server for grouping devices in a same space, comprising:

a memory; and
a processor coupled to the memory, wherein the processor is configured to:
connect a plurality of devices to the server;
classify the plurality of devices to two types based on mobility, including a stable device type and a mobile device type;
identify one or more neighborhood devices associated with at least one stable device based on the status information of the plurality of devices;
request one of the at least one stable device to record and send a sound sample;
determine whether the sound sample is a noticeable sound sample, wherein a noticeable sound sample is a sound sample with a content measurement above a preset threshold, and at least one of a signal-to-noise ratio of the sound sample and an entropy of the sound sample is used as a content measurement metric to compare with the preset threshold;
when the sound sample is determined to be a noticeable sound sample, respectively request the at least one stable device and the one or more neighborhood devices to record and send an audio sample at a set time, wherein the audio sample is respectively recorded by the at least one stable device and the one or more neighborhood devices at a same time point in the same space;
respectively calculate a similarity score between the audio sample of the one or more neighborhood devices and the audio sample of the at least one stable device; and
determine one or more devices among the one or more neighborhood devices as in the same space as one or more of the at least one stable device based on the similarity score, so that the one or more devices among the one or more neighborhood devices are automatically identified as a same group in the same space.

7. The server according to claim 6, wherein when respectively calculating the similarity score, the processor is further configured to:

obtain an acoustic fingerprint for each audio sample, wherein the acoustic fingerprint is a numeric code, and the acoustic fingerprint is calculated by one of the server and the device that recorded the audio sample; and calculate a similarity score between two corresponding acoustic fingerprints to be used as the similarity score between the audio sample of the one or more neighborhood devices and the audio sample of the at least one stable device.

8. The server according to claim 6, wherein:

the status information of a device includes at least one of an IP address, a WiFi access configuration, and a GPS location.

9. The server according to claim 8, wherein a first device and a second device are determined as neighborhood devices when:

the first device is connected with the second device;
the first device is in a same network as the second device;
the first device is connected with a third device and the third device is the neighborhood device of the second device; or
the first device is located within a preset range of the second device.

10. The server according to claim 7, wherein the processor is further configured to:

provide a cross-device service to the devices in the same space, wherein the cross-device service includes at least one of: present a media content on one or more devices in the same space, and adjust a setting of one or more devices in the same space.

11. A system for grouping devices in a same space, comprising:

a plurality of devices having audio recording and communication capabilities; and
a server including:
a memory; and
a processor coupled to the memory, wherein the processor is configured to:
connect the plurality of devices to the server;
classify the plurality of devices to two types based on mobility, including a stable device type and a mobile device type;
identify one or more neighborhood devices associated with at least one stable device based on the status information of the plurality of devices;
request one of the at least one stable device to record and send a sound sample;
determine whether the sound sample is a noticeable sound sample, wherein a noticeable sound sample is a sound sample with a content measurement above a preset threshold, and at least one of a signal-to-noise ratio of the sound sample and an entropy of the sound sample is used as a content measurement metric to compare with the preset threshold;
when the sound sample is determined to be a noticeable sound sample, respectively request the at least one stable device and the one or more neighborhood devices to record and send an audio sample at a set time, wherein the audio sample is respectively recorded by the at least one stable device and the one or more neighborhood devices at a same time point in the same space;

respectively calculate a similarity score between the audio sample of the one or more neighborhood devices and the audio sample of the at least one stable device; and determine one or more devices among the one or more neighborhood devices as in a same space as one or more of the at least one stable device based on the similarity score, so that the one or more devices among the one or more neighborhood devices are automatically identified as a same group in the same space;

wherein the plurality of devices are further configured to respond to the control request from the server.

12. The system according to claim 11, wherein when respectively calculating the similarity score, the processor of the server is further configured to:

obtain an acoustic fingerprint for each audio sample, wherein the acoustic fingerprint is a numeric code, and the acoustic fingerprint is calculated by one of the server and the device that recorded the audio sample; and calculate a similarity score between two corresponding acoustic fingerprints to be used as the similarity score between the audio sample of the one or more neighborhood devices and the audio sample of the at least one stable device.

13. The system according to claim 11, wherein:

the status information of a device includes at least one of an IP address, a WiFi access configuration, and a GPS location.

14. The system according to claim 13, wherein a first device and a second device are determined as neighborhood devices when:

the first device is connected with the second device;

the first device is in a same network as the second device;

the first device is connected with a third device and the third device is the neighborhood device of the second device; or the first device is located within a preset range of the second device.

15. The system according to claim 11, wherein the server is further configured to:

provide a cross-device service to the devices in the same space, wherein the cross-device service includes at least one of: present a media content on one or more devices in the same space, and adjust a setting of one or more devices in the same space.

16. The method according to claim 1, wherein the same space refers to a same room in a house, or a same section in an exhibition hall.

* * * * *